United States Patent
Sarangapani et al.

[11] Patent Number: 5,950,147
[45] Date of Patent: Sep. 7, 1999

[54] METHOD AND APPARATUS FOR PREDICTING A FAULT CONDITION

[75] Inventors: Jagannathan Sarangapani, Peoria; David R. Schricker, Dunlap, both of Ill.

[73] Assignee: Caterpillar Inc., Peoria, Ill.

[21] Appl. No.: 08/870,113

[22] Filed: Jun. 5, 1997

[51] Int. Cl.$^6$ .............................. G05B 19/48; G05B 15/00
[52] U.S. Cl. ..................... 702/179; 702/181; 702/182; 701/1; 701/29
[58] Field of Search ................ 364/551.02, 551.01, 364/550, 554, 570, 577; 340/870.01, 901, 425.5, 500, 514, 517, 526; 701/1, 29; 702/176, 177, 179, 182, 181, 183, 184, 185, 187, 189

[56] References Cited

U.S. PATENT DOCUMENTS

| | | | |
|---|---|---|---|
| 3,882,305 | 5/1975 | Johnstone | 235/151.11 |
| 4,215,412 | 7/1980 | Bernier et al. | 364/551 |
| 4,644,479 | 2/1987 | Kemper et al. | 364/550 |
| 4,816,987 | 3/1989 | Brooks et al. | 364/165 |
| 4,980,844 | 12/1990 | Demjanenko et al. | 364/550 |
| 5,025,391 | 6/1991 | Filby et al. | 364/513 |
| 5,155,468 | 10/1992 | Stanley et al. | 340/501 |
| 5,210,704 | 5/1993 | Husseiny | 364/551.01 |
| 5,293,323 | 3/1994 | Doskocil et al. | 364/551.01 |
| 5,414,632 | 5/1995 | Mochizuki et al. | 364/474.16 |
| 5,453,939 | 9/1995 | Hoffman et al. | 364/551.01 |
| 5,463,567 | 10/1995 | Boen et al. | 364/551.01 |
| 5,486,997 | 1/1996 | Reismiller et al. | 364/165 |
| 5,561,610 | 10/1996 | Schricker et al. | 364/551.01 |
| 5,566,091 | 10/1996 | Schricker et al. | 364/551.01 |
| 5,602,761 | 2/1997 | Spoerre et al. | 364/554 |
| 5,610,339 | 3/1997 | Haseley et al. | 73/660 |
| 5,638,273 | 6/1997 | Coiner et al. | 364/424.04 |

FOREIGN PATENT DOCUMENTS

| | | | |
|---|---|---|---|
| 0691631 | 10/1996 | European Pat. Off. | G07C 3/00 |
| 9324872 | 12/1993 | WIPO | G05B 23/02 |

*Primary Examiner*—Patrick Assouad
*Attorney, Agent, or Firm*—David M. Masterson

[57] ABSTRACT

An apparatus for predicting a fault condition for a machine is disclosed. The machine has a plurality of parameters being dependent upon machine performance. A sensor connected to the machine produces an electrical signal in response to one of the plurality of machine parameters. A computer produces a data trend of the parameter in response to the electrical signal, calculates the duration and slope of the trend, and predicts the time period in which the trend will exceed the warning level.

16 Claims, 7 Drawing Sheets

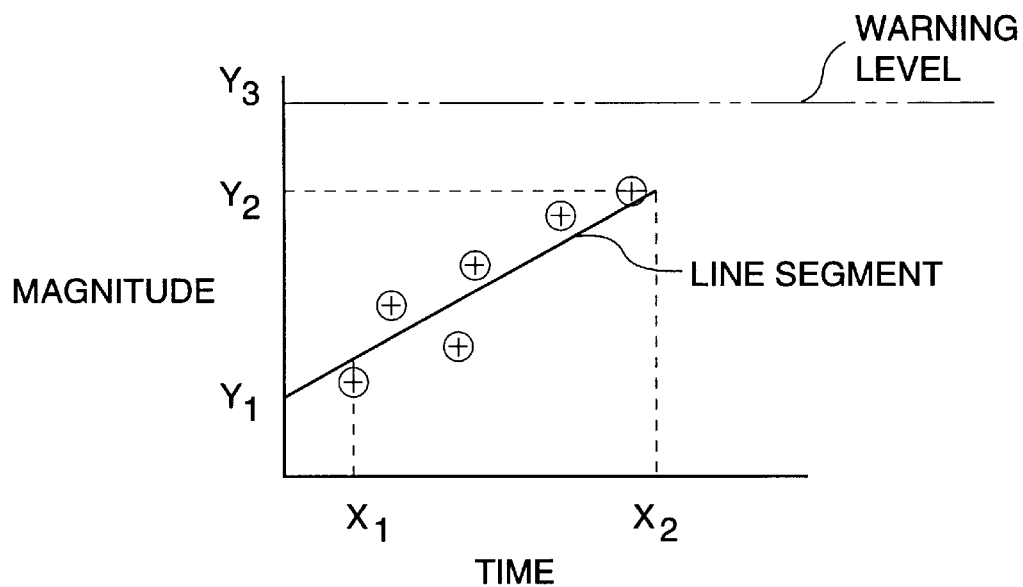
Fig-5-
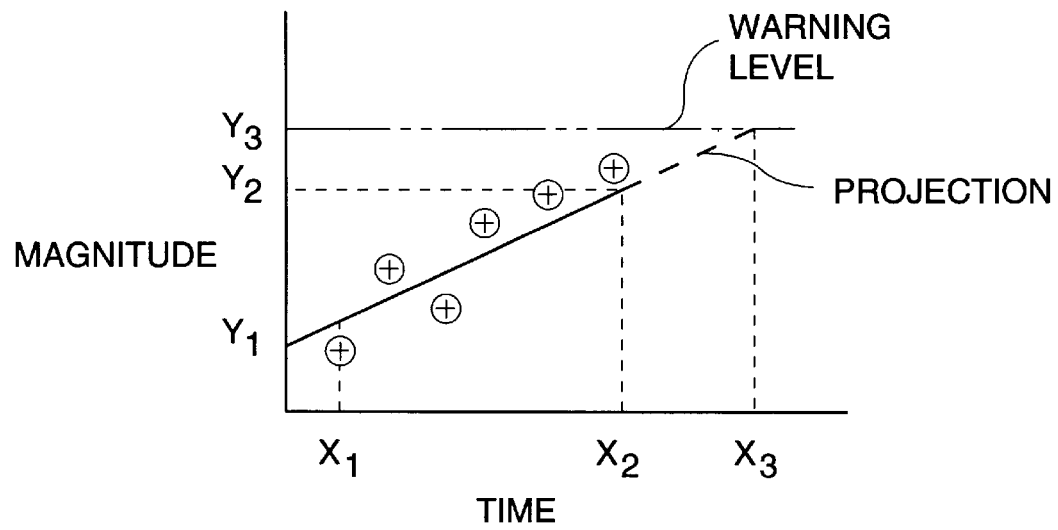
Fig-11-

METHOD AND APPARATUS FOR PREDICTING A FAULT CONDITION

TECHNICAL FIELD

The invention relates generally to a device for predicting a fault condition, and more particularly, to a method and apparatus for predicting a fault condition in response to the trend of a machine parameter.

BACKGROUND ART

For service and diagnostic purposes, machines are sometimes equipped with sensors for measuring operating conditions such as engine RPM, oil pressure, water temperature, boost pressure, oil contamination, electric motor current, hydraulic pressure, system voltage, and the like. In some cases, storage devices are provided to compile a data base for later evaluation of machine performance and to aid in diagnosis. Service personnel examine the accrued data to get a better picture of the causes of any machine performance degradation, wear, or failure. Similarly, service personnel evaluate the stored data to predict future failures and associated collateral damages, and to correct any problems before total component failure.

In addition, these stored parameters may be examined by service or supervisory personnel to evaluate machine and/or operator performance to ensure maximum productivity of the machine. These issues are particularly pertinent to over-the-highway trucks and large work machines such as off-highway mining trucks, hydraulic excavators, track-type tractors, wheel loaders, and the like. These machines represent large capital investments and are capable of substantial productivity when operating. It is therefore important to predict significant performance loss, wear and catastrophic failures so servicing can be scheduled during periods in which productivity will be less affected and so minor problems can be repaired before they lead to catastrophic failures.

Similarly, it is sometimes advantageous to accumulate parameters only when the machine is in a particular operating condition. This type of information is predominantly used during performance evaluation but may also be used in failure diagnosis and prognosis. For example, the length of time spent in a particular gear while the machine is loaded may be needed to evaluate machine performance.

The present invention is directed to overcoming one or more of the problems set forth above.

DISCLOSURE OF THE INVENTION

An apparatus for predicting a fault condition for a machine is disclosed. The machine has a plurality of parameters being dependent upon machine performance. A sensor connected to the machine produces an electrical signal in response to one of the plurality of machine parameters. A computer produces a data trend of the parameter in response to the electrical signal, calculates the duration and slope of the trend, and predicts the time period in which the trend will exceed the warning level.

BRIEF DESCRIPTION OF THE DRAWINGS

For a better understanding of the present invention, reference may be made to the accompanying drawings, in which:

FIG. 5 illustrates an example group of data points used to fit a line segment of a trend;

FIG. 11 illustrates an example projection of a line segment.

BEST MODE FOR CARRYING OUT THE INVENTION

Figure 1:
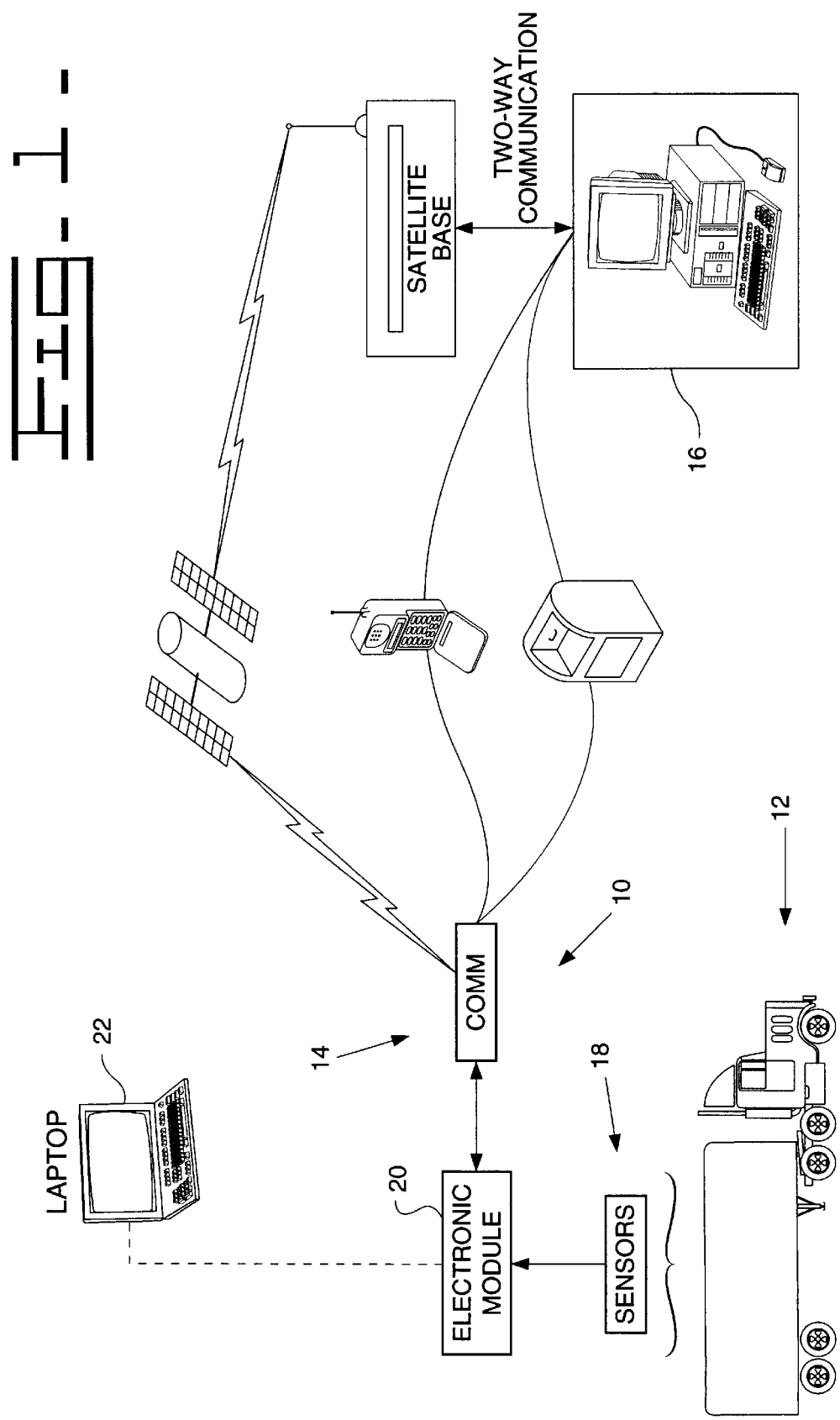
FIG. 1 illustrates a high level diagrammatic illustration of a machine prognostic system.

Referring to FIG. 1, a machine prognostic system is shown generally by the number 10 and is a data acquisition, analysis, storage, and display system for a work machine 12. Employing a complement of on-board and off-board hardware and software, the machine prognostic system 10 monitors and derives machine component information and analyzes the resulting data to indicate and/or predict impending component or system failures.

FIG. 1 illustrates a variety of potential communication systems 14 that may be used to transfer data from the work machine 12 to a central computer system 16 for analysis. For example, the data may be transferred by a satellite system back to the central computer system 16. Alternatively, the data may be transferred by a cellular telephone system or by storing data on a computer disk which is then mailed to the central computer site for analysis.

It should be understood that all aspects of the present invention could be located on-board the work machine 12 thereby eliminating the need for a communication system 14; however, the central computer system 16 allows an entire fleet to be monitored at a central location.

Subsets of the data are also transmitted to a display module (not shown) in the operator compartment of the work machine 12 for presentation to the operator in the form of gauges and warning messages. During normal operation, gauge values are displayed in the operator compartment. During out-of-spec conditions, alarms and warning/instructional messages are also displayed.

In the preferred embodiment, sensed data is directly sampled by sensors 18 of a type well-known in the art for producing electrical signals in response to the level of operational parameters and includes pulse-width modulated sensor data, frequency-based data, five volt analog sensor data, and switch data that has been effectively debounced. The sensors are connected to an electronic module 20 for delivery of the sensor signals.

Figure 2:
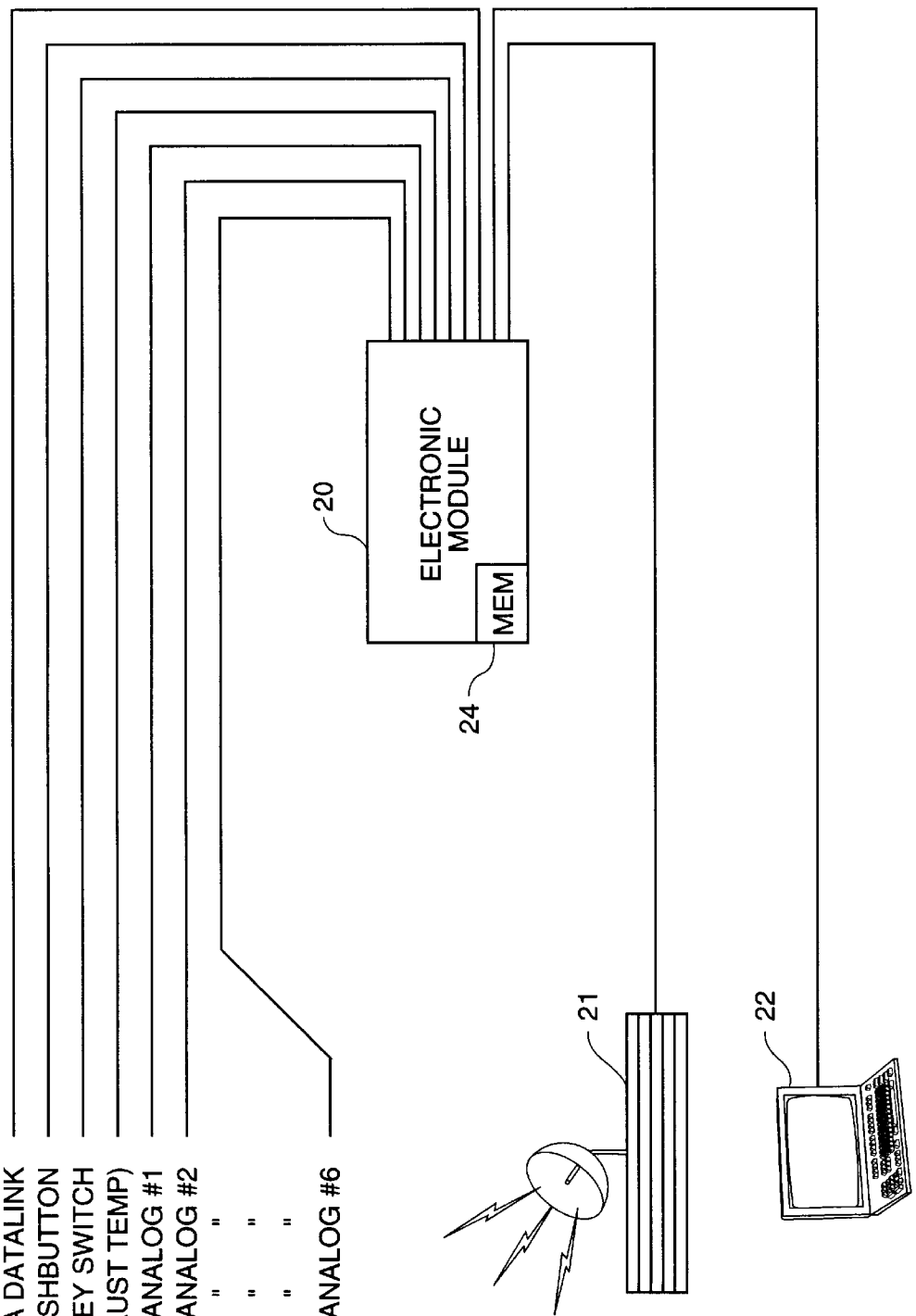
FIG. 2 illustrates a plurality of machine parameter connections to an electronic module of the machine prognostic system.

In the embodiment of FIGS. 1 and 2, the sensor signals are delivered to the electronic module 20 by either direct connection of analog sensors, connection by way of an RS485 link, or over a datalink governed by SAE specifications J1587 and J1708. A push-button is also included to trigger the acquisition of a snapshot of data. Connection is also provided from the machine battery and key switch to the electronic module 20.

In the preferred embodiment, the electronic module 20 includes a microprocessor, a lower level communications board (not shown) of a type well-known in the art, and a memory section 24 including high level flash memory and battery backed RAM. The electronic module also includes a pair of RS232 connections, one being available for connection to the satellite communications system 21 and the other being available for connection to an off-board computer 22 used in download of data and initialization of the system. In the preferred embodiment, the off-board computer 22 is a laptop personal computer.

To document the performance of the machine and/or its major components, performance baselines are stored in an array within the memory device located in the electronic module 20. These baselines are used during key, repeatable performance checks of the machine to help verify machine/component health and, as discussed below, are used as reference points to determine whether the machine is in an operating condition in which machine parameters are to be processed and stored.

A subset of parameters for which trend data is to be produced is either predefined or defined via the off-board computer 22 or the central computer 16. Each parameter includes a dependency definition that identifies the conditions under which data will be stored for trending purposes. Typically, the dependency definition is selected to indicate the normal operating conditions of the machine; for example, when engine RPM or boost pressure are above a predetermined levels. The trending definition for each parameter may vary and may be a function of several other machine parameters that shall be referred to as dependencies. Trend data is gathered and stored in memory as the specified dependency definition is met over a specified trend period, which is measured either in time, such as over a period of ten hours, or in counts, such as over a period of ten transmission shifts. Trend data is only obtained while the engine is running. Based on the specified trend type, the maximum, minimum, or cumulative value of data gathered during this period is then stored as a single trend point with counts to determine the average value and/or the points available. The determination of whether to use the average, maximum, or minimum value to obtain the trend point is based on the system designer's decision regarding which type of calculation would provide the best indication of changes in engine performance or impending failures. It should also be understood that multiple values could be calculated for the same sensed parameter, i.e., trend points could be calculated to indicate both an average value and a minimum value for a designated machine parameter.

Figure 3:
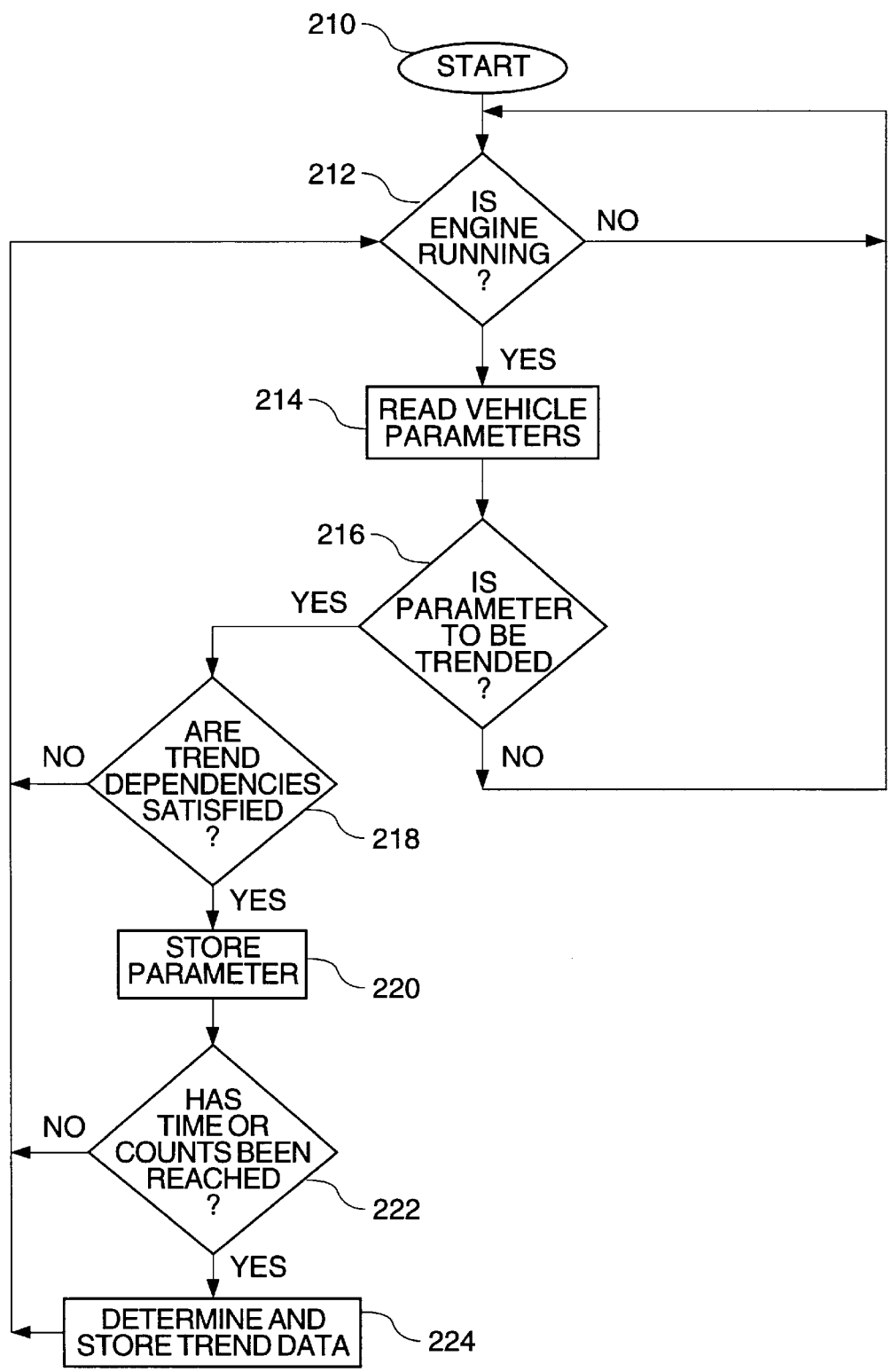
FIG. 3 illustrates a method performed by the electronic module to trend machine parameters.

Referring now to FIG. 3, one method executed by the processor within the electronic module 20 to perform the above functions is now described. The electronic module 20 first determines whether the engine is running. Advantageously, the engine is determined to be running if engine speed exceeds cranking engine speed. If the engine is not running, then the method will not proceed. If the engine is running, the electronic module 20 reads the sensed machine parameters from the datalink or other inputs.

For each of the sensed parameters, the electronic module 20 determines whether that parameter is to be processed to provide trend data. If trend data is to be provided, the trending definition is retrieved and the dependency parameters are checked to determine whether the dependency definition is satisfied. The dependency definition for each operating parameter of interest is defined in terms of other sensed machine parameters. For example, the dependency definition for boost pressure may be satisfied only when engine RPM is greater than a low operating speed and less than a high operating speed, when the engine rack setting is greater than a predetermined level, and when the jacket water temperature is greater than a predefined operating temperature. That is, values for boost pressure are only saved and processed for producing trend information when the above conditions are satisfied. In this way, all boost pressure values used to produce the trend data will have been acquired when the engine is in the same general operating condition. It should be understood that the actual ranges, minimums, and maximums used in the dependency definitions are determined empirically to define the operating conditions of interest and will vary from machine to machine and application to application.

If the dependency definition is satisfied, the value of the sensed parameter is stored. This process is continued until either the time period over which each trend point is to be determined or the number of events for which each trend point is to be determined is reached at which point the electronic module 20 calculates and stores the trend point. The time period or number of events is selected in response to the designer's desire for precision, the availability of memory space in the memory device, and the length of time or number of counts required to obtain meaningful trend points. The calculation of the trend point may include accumulating the stored values, selecting the maximum stored value, or selecting the minimum stored value. The calculated trend point is saved and the data array for that parameter is then cleared to allow for the storage of data for calculation of the next trend point for that parameter.

Figure 4:
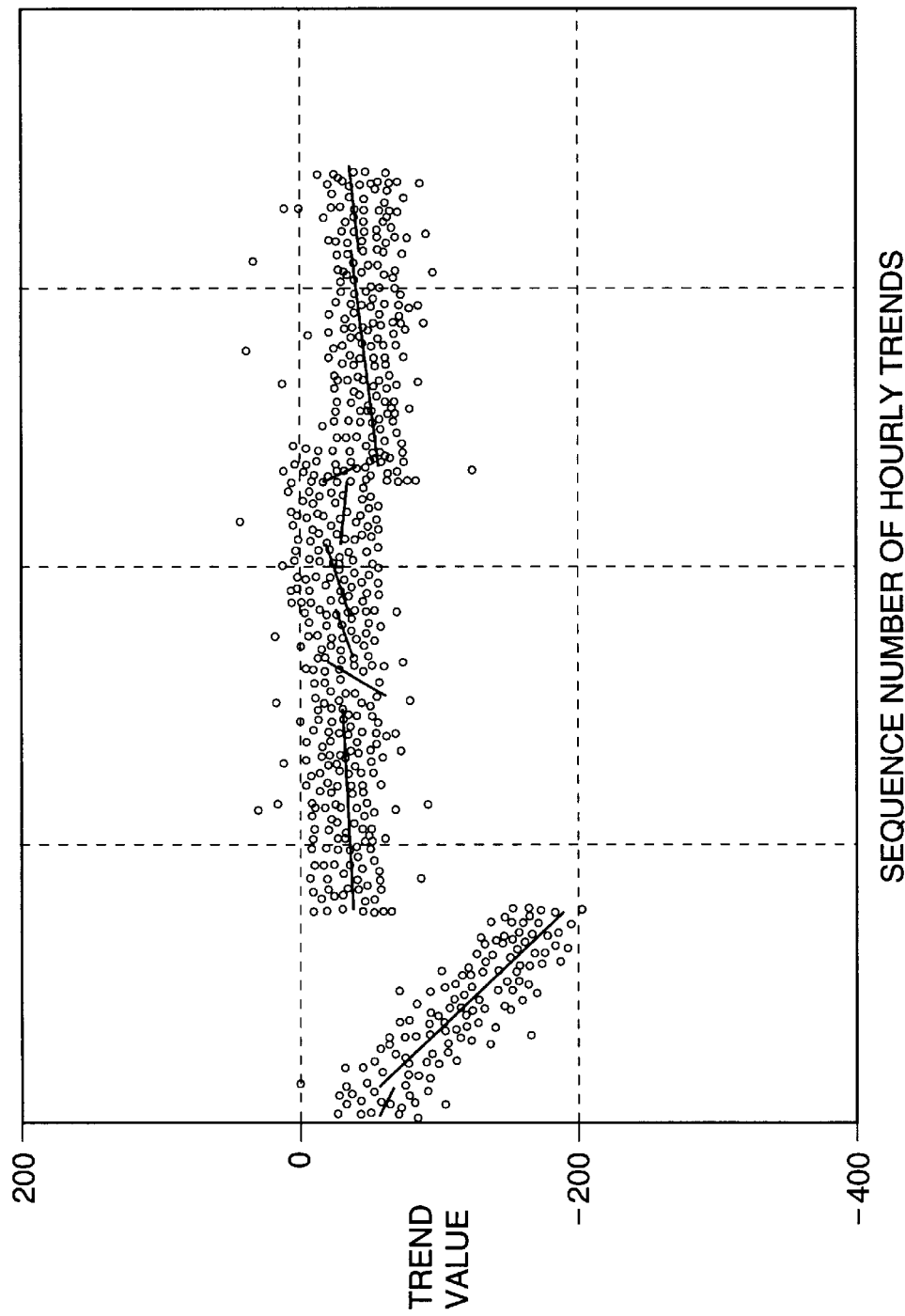
FIG. 4 illustrates an example of a trend of a machine parameter.

Trend data obtained by way of the method of FIG. 3 is illustrated in FIG. 4. While the illustrated data has a substantial variance, straight lines can be fit to the data to illustrate the general trend of the data by known curve fitting techniques, such as the least-squares method. The overall trend is formed by storing a specified number of points in the memory device depending on the size of the available memory area and the length of the desired historical data base.

In addition to the trend data produced for sensed parameters, it should be understood that calculated values, such as net horsepower or driveline torque, may also be trended in a similar manner. Typically, these calculated values are determined by the electronic module 20 according to predetermined definitions in response to a plurality of sensed parameter signals.

Trend data may be reset and the definitions may be redefined by the off-board system 22 via one of the communication ports. For example, if a particular application of the machine requires a different dependency definition for one or more of the sensed parameters, the off-board system 22 is used to modify the dependency definition by providing commands to erase a given array including a given dependency definition and replace that definition with a new dependency definition. Similarly, this function may be performed by the central computer system 16 via the communication system 14.

Based on the slope and duration of the trends illustrated in FIG. 4, certain judgments can be made regarding the likelihood of impending component or system failure based on machine performance loss, degradation or wear. To help make these judgments, trending functions are defined in terms of slope and duration of particular trends. The slope refers to the actual slope of the line segment and is indicative of how fast the trend is approaching a predetermined warning level. The duration indicates the duration in time that data has been collected, e.g., the duration indicates the history of the trend. Another trending function is referred to as the distance function. The distance function is related to the position of the last data point of the trend, and indicates the relative distance of the last data point to the predetermined warning level. Reference is now made to FIG. 5, which represents a collection of data points that are stored in a two-dimensional map representing a Cartesian coordinate system. Using the figure shown on FIG. 5, the trending functions may be determined as follows:

distance=$y_3-y_2$ duration=$x_2-x_1$

Finally, the slope is determined by:

$$slope = \frac{y_2 - y_1}{x_2 - x_1}$$

Once a trend has been produced, i.e., a line segment has been constructed, the present invention is directed towards determining when the line segment should be projected in order to determine prognostic information. This determination is based on the trending functions.

Figure 6:
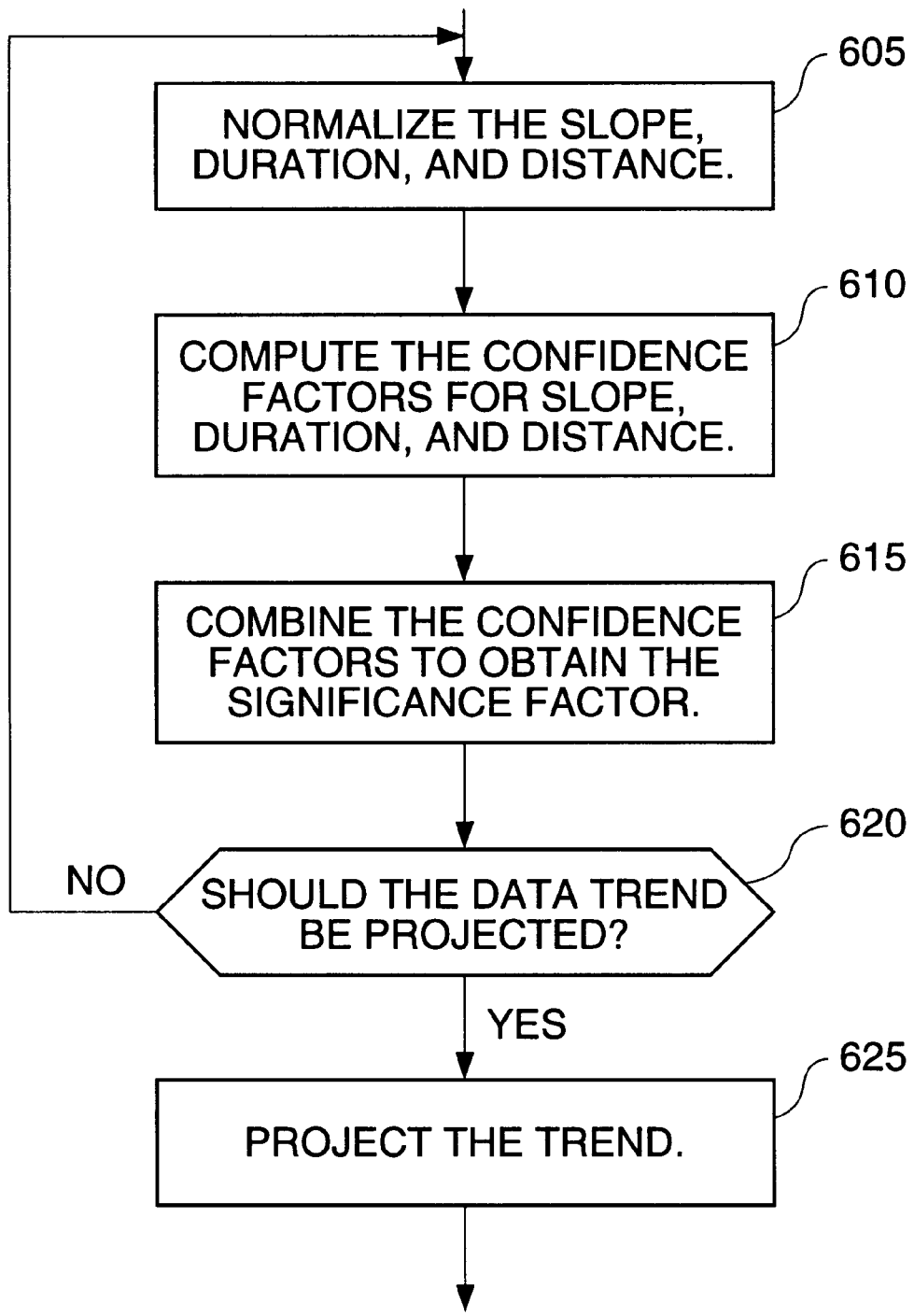
FIG. 6 illustrates a method for projecting the line segment.

Referring now to FIG. 6, the present invention is described by a method 600 that determines the point in time in which the trend should be projected and the duration of the projection. At block 605 the method normalizes the slope, duration and distance functions.

Figure 7:
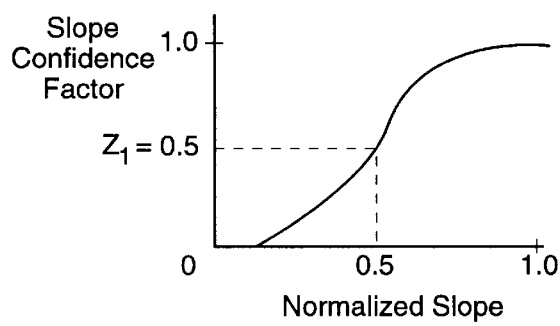
FIG. 7 illustrates a look-up table including a plurality of trend slope values that correspond to a plurality of slope confidence factors.

For example, reference is made to FIG. 7, which illustrates a slope function that has been normalized. For example, the slope function represents the slope of the trend or line segment between 0° and 90°. However, when the slope is normalized, the value of the slope function falls between 0 and 1.

Once the slope has been normalized, then a confidence factor for the normalized slope is determined in accordance with block 610 of FIG. 6. A confidence factor is defined as the probability that the particular function, e.g., slope function, that is generated is a good approximation of the particular function of the actual trend. The confidence factor may be determined in response to a linear, sigmoid or gaussian function.

For example, FIG. 7 represents a look-up table that stores a plurality of normalized slope values that correspond to a plurality of slope confidence factors. As shown, the x-axis refers to the normalized slope and the y-axis refers to the confidence factor which is represented by symbol $z_1$. The confidence factor for the slope function ranges in magnitude from 0 to 1.0. In one embodiment, a two-dimensional look-up table of a type well known in the art is used to store the desired characteristics. The number of characteristics stored in memory is dependent upon the desired precision of the system. Based on the actual slope value, the method of the present invention selects the corresponding slope confidence factor. Interpolation may be used to determine the slope confidence factor in the event that the stored values fall between the discrete values stored in memory. The table values are based from simulation and analysis of empirical data. Continuing this example, assuming a normalized slope of 0.5 has been calculated, then the method would select a confidence factor of 0.5.

Alternatively, the slope confidence factor may be determined according to the following equation:

$$slope\ confidence\ factor = \frac{k}{1 + e^{-(slope)}}$$

where k represents a predetermined gain value and the negative exponent represents the normalized slope.

Figure 8:
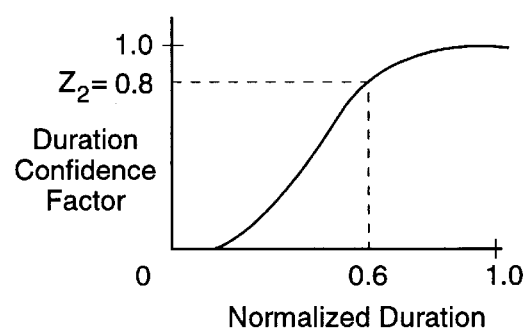
FIG. 8 illustrates a look-up table including a plurality of trend duration values that correspond to a plurality of duration confidence factors.

Once the duration function is normalized, then the confidence factor for the duration function is computed. Reference is now made to FIG. 8, which represents a look-up table that stores a plurality of normalized duration values that correspond to a plurality of duration confidence factors. The confidence factor for the duration function is represented by symbol $Z_2$ and ranges in magnitude from 0 to 1.0. As an example, assuming that a normalized duration of 0.6 has been calculated, then the method selects a confidence factor of 0.8.

Alternatively, the confidence factor for the duration function may be determined in accordance with the following equation:

$$duration\ confidence\ factor = \frac{k}{1 + e^{-(duration)}}$$

where the negative exponent represents the normalized duration.

Figure 9:
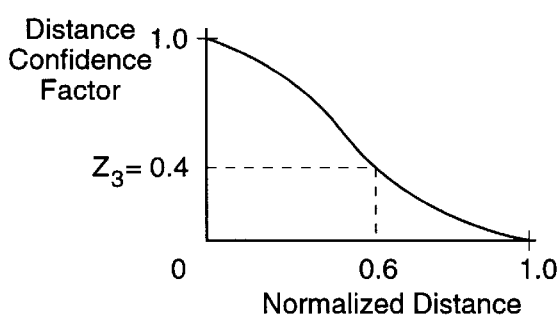
FIG. 9 illustrates a look-up table including a plurality of trend distance values that correspond to a plurality of distance confidence factors.

Once the distance function is normalized, then the confidence factor for the distance function is computed. Referring now to FIG. 9, which represents a look-up table that stores a plurality of normalized distance values that correspond to a plurality of distance confidence factors, the confidence factor for the distance function is determined. The confidence factor for the distance function is represented by symbol $Z_3$ and ranges in magnitude from 0 to 1.0. As an example, assuming a normalized distance of 0.6 has been calculated, then the method selects a confidence factor of 0.4.

Alternatively, the confidence factor for the distance function may be determined in accordance with the following equation:

$$distance\ confidence\ factor = \frac{1}{1 + e^{distance}}$$

where the exponent represents the normalized distance.

In accordance with block 615 of FIG. 6, the confidence factors are combined to determine a significance factor. A significance factor is defined as the probability that a significant trend of a parameter or a variable exists. The significance factor may be computed by the following equation:

$$significance\ factor = \frac{w_1 z_1 + w_2 z_2 + w_3 z_3}{w_1 + w_2 + w_3}$$

where $w_1$, $w_2$, $w_3$ are predetermined values that represent preferred weighting factors.

Although the significance factors are shown to be a combination of the individual confidence factors, the significance factor may be determined in other ways, including determining a significance factor for each function individually and then combining the significance factors for each function to obtain an overall significance factor.

Figure 10:
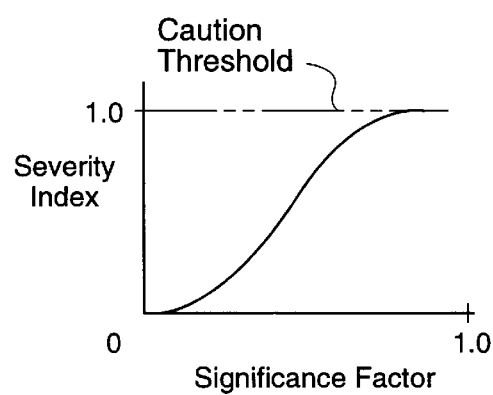
FIG. 10 illustrates a look-up table including a plurality of significance factors that correspond to a plurality of severity indices.

Referring now to FIG. 10, the significance factor is trended and stored in a two-dimensional look-up table against a severity index. A severity index is defined as the probability that the machine or component on the machine will experience a fault. In other words, the severity index indicates how severe the machine is being used. For example, if the severity index is high, it may be desirable to use the machine for less severe applications to avoid an unanticipated failure. Consequently, the machine can be used until the next programmed maintenance is scheduled.

Referring back to method step 620 of FIG. 6, if the severity index reaches a caution threshold, then the data trend or line segment should be projected. Assuming that the line segment should be projected, then method step 625 determines the projected duration of the last data point to the warning level. The data trend or line segment is projected by simply extending the line segment to the warning level based on the slope, as shown in FIG. 11. Thus, the time duration of the projection indicates how long the machine can be used in the current environment before a failure will likely occur. For example, the time period to the warning level, i.e., the time period in which the component may fail, may be determined according to:

$$x_3 - x_2 = \frac{y_3 - y_2}{\text{slope}}$$

The time duration of the projection, i.e., the time that a fault condition may occur, may be indicated to the operator via a display panel. The time duration of the projection may also be stored for use by diagnostic personnel at both of the work machine 12 and central computer system 16.

INDUSTRIAL APPLICABILITY

Work machines such as over-the-highway trucks and large mining and construction machines represent large capital investments and significantly reduce overall productivity for the owner when they are being repaired. To reduce the loss of productivity, the present invention provide service and supervisory personnel with historical data relating to sensed machine parameters. This historical data is then used to diagnose failures, predict future failures, and evaluate machine and/or operator performance.

Other aspects, objects, and advantages of this invention can be obtained from a study of the drawings, the disclosure, and the appended claims.

We claim:

1. An apparatus for predicting a fault condition, comprising:
    a machine having a plurality of parameters being dependent upon machine performance;
    a sensor connected to the machine and adapted to produce an electrical signal in response to one of the plurality of machine parameters;
    means for producing a data trend of the parameter in response to the electrical signal;
    means for calculating the duration and slope of the trend;
    means for calculating the distance from the last data point of the trend to a warning level;
    means for determining a severity index; and
    means for predicting the time period in which the trend will exceed the warning level in response to the duration, slope, and distance, and modifying the use of the machine as a function of the severity index and the predicted time period.

2. An apparatus, as set forth in claim 1, including means for normalizing the trend, duration and distance magnitudes.

3. An apparatus, as set forth in claim 2, including means for selecting a confidence factor for each of the normalized slope, duration and distance magnitudes.

4. An apparatus, as set forth in claim 3, including means for storing a plurality of normalized trend, duration and distance magnitudes that correspond to a plurality of associated confidence factors, comparing the actual normalized magnitude to the stored normalized magnitudes, and selecting a corresponding confidence factor for each of the normalized slope, duration and distance magnitudes.

5. An apparatus, as set forth in claim 4, including means for combining the slope, duration, and distance confidence factors to obtain a significance factor.

6. An apparatus, as set forth in claim 5, including means for trending the significance factor against the severity index.

7. An apparatus, as set forth in claim 6, including means for comparing the severity index with a caution threshold and projecting the data trend in response to the severity index exceeding the caution threshold.

8. An apparatus, as set forth in claim 7, including means for projecting the data trend by extending the data trend to the warning level based on the slope of the data trend.

9. A method for predicting a fault condition for a machine having a plurality of parameters being dependent upon machine performance, the method including the following steps:
    producing an electrical signal in response to one of the plurality of machine parameters;
    producing a data trend of the parameter in response to the electrical signal;
    calculating the duration and slope of the trend;
    calculating the distance from the last data point of the trend to a warning level;
    determining a severity index;
    predicting the time period in which the trend will exceed the warning level in response to the duration, slope, and distance; and
    modifying the use of the machine as a function of the severity index and the predicted time period.

10. A method, as set forth in claim 9, including the steps of normalizing the trend, duration and distance magnitudes.

11. A method, as set forth in claim 10, including the steps of selecting a confidence factor for each of the normalized slope, duration and distance magnitudes.

12. A method, as set forth in claim 11, including the steps of storing a plurality of normalized trend, duration and distance magnitudes that correspond to a plurality of associated confidence factors, comparing the actual normalized magnitude to the stored normalized magnitudes, and selecting a corresponding confidence factor for each of the normalized slope, duration and distance magnitudes.

13. A method, as set forth in claim 12, including the step of combining the slope, duration, and distance confidence factors to obtain a significance factor.

14. A method, as set forth in claim 13, including the step of trending the significance factor against the severity index.

15. A method, as set forth in claim 14, the steps of comparing the severity index with a caution threshold and projecting the data trend in response to the severity index exceeding the caution threshold.

16. A method, as set forth in claim 15, including the step of projecting the data trend by extending the data trend to the warning level based on the slope of the data trend.

* * * * *